Patented May 15, 1951

2,552,775

UNITED STATES PATENT OFFICE 2,552,775

DRILLING FLUID

Paul W. Fischer and James F. Cook, Long Beach, Calif., assignors to Union Oil Company of California, Los Angeles, Calif., a corporation of California No Drawing. Application March 20, 1948, Serial No. 16,145

24 Claims. (Cl. 252—8.5)

This invention relates to fluids employed in the drilling of oil, gas and other wells and to methods for drilling wells employing such fluids. The invention more particularly relates to fluids known as drilling muds which are employed in the drilling of oil wells with rotary drilling tools, and which drilling muds contain added agents to impart desirable physical characteristics and to treat simultaneously the producing formation to provide an increased initial petroleum production rate.

In drilling an oil, gas or water well by means of rotary drilling tools, hollow drill pipe or drill stem with a rotary bit attached to the lower end is used. The drill pipe and bit are rotated to drill out the borehole. A fluid commonly termed a drilling mud is circulated downwardly through the hollow drill stem and bit to the bottom of the borehole and then upwardly to the surface through the annular space between the drill stem and the face of the borehole. The drilling mud in general comprises a suspension of solid material in a liquid medium such as water and may contain other added agents. The drilling mud serves to lubricate and cool the drill bit, suspend and carry cuttings out of the borehole, plaster the face of the borehole with a thin impervious layer of solid material to prevent flow of fluids into or out of the formation, apply a hydrostatic pressure to the formation to counterbalance the pressure of liquids or gases sometimes present there, and fulfill other requirements.

In order for the drilling fluid to perform the above functions it must have certain desirable physical properties. The fluid must have a viscosity of such a magnitude that it is conveniently pumpable without undue pressure differentials. It must be sufficiently thixotropic so that cuttings will remain suspended in the borehole should circulation of the mud be stopped for any reason, and in addition readily release the cuttings from suspension when the fluid is agitated as in the settling pits. It must further form a thin impervious filter cake on the borehole face to prevent the loss of the liquid medium present in the drilling mud by filtration into the formations through which the borehole passes. Such a filter cake effectively seals the face of the borehole and inhibits any tendencies toward sloughing, heaving or cave-in of rock into the borehole. The fluid must be further capable of suspending weighting agents such as inorganic compounds having high specific gravities, such as compounds of the heavy metals, so that a pressure substantially greater than the hydrostatic pressure of a column of water of equal depth may be applied to the formation when necessary. The fluid should also be of such a constitution that the presence of granular material, such as cuttings formed in drilling the borehole and which may be assimilated or dissolved by the drilling mud, has substantially no effect on the physical properties of the drilling fluid.

One physical characteristic of a drilling mud which is of considerable importance is its ability to form a thin impervious cake on the walls or the face of the borehole to seal this surface against fluid flow therethrough. This property may also be termed the cake-forming, water loss, sealing, or filtration characteristic. A measure of the ability of a drilling mud to form such a thin impervious layer may be obtained by means of a simple filtration test in which the mud cake is formed and pressed against the membrane or filter which is permeable to water. A standardized procedure for determining the filtration rate is described in "Recommended Practice on Field Procedure for Testing Drilling Fluids A. P. I. Code No. 29, second edition" published July 1942 beginning on page 11. The test briefly comprises measuring the total volume of filtrate water obtained during a given time interval of pressure filtration. The best procedure for determining the filtration rate is to measure the filtrate volume obtained during the first hour of the test, however, the volume of filtrate obtained during the first five minutes or the first fifteen minutes of filtration may be employed as an indication of the filtration rate. Numerous correlations of such filtration rate determinations with actual drilling experience with the same drilling muds have indicated that fluid yielding a total filtrate in excess of about 22 ml. during the first fifteen minutes may be dangerous to use and that drilling muds yielding less than about 15 ml. during the first fifteen minutes under the same testing conditions are generally very satisfactory.

Another important characteristic of drilling muds is their viscosity which should be of such a magnitude that the fluid may be readily and easily circulated by pumping such as is ordinarily employed during drilling operations. A standardized procedure is generally used in which a Marsh funnel viscosimeter is employed. The time required for a given volume of drilling mud to pass through the funnel is determined and taken as an indication of the viscosity or pumpability. This test may be conducted by measuring 1500 ml. of drilling fluid into the funnel and measuring the time required for 942 ml. (one quart) to run out, or by measuring 500 ml. in and allowing that quantity to run out. The viscosity thus determined is given in terms of time in seconds. The standardized procedure for the determination of the Marsh viscosity, apparent viscosity or funnel viscosity, as they may be termed, may be found in "Recommended Practice on Standard Field Procedure for Testing Drilling Fluids, A. P. I. Code No. 29, second edition" published July, 1942, page 6.

Oil-producing formations are believed to be porous layers containing sand and having varying degrees of permeability to the flow of fluids such as oil, water, or gas. Consequently, the rate of oil production from an oil well as largely determined by the rate of flow of oil through these permeable formations which in turn is dependent upon the porosity or permeability of the sand or stone present. In drilling through such a porous layer it has been considered necessary to employ a drilling mud having such characteristics that liquids or solids were prevented from penetrating the porous producing formation since undesirable effects were believed to result from such penetration. In employing water base drilling fluids, the porous formation was assumed to become wet by water causing the production rate of the wells to be less than if the formation was preferentially wet by oil.

Further, some porous oil-bearing formations contain argillaceous materials, such as in certain California oil fields, which are caused to swell when contacted by fresh water thus filling the interstices of the porous formation and decreasing the permeability to oil flow. The use of drilling fluids containing substantial quantities of saline constituents, such as concentrated or even saturated solutions of sodium chloride, have been previously used in an effort to inhibit the decrease in oil production rate caused by wetting and swelling the formation with water and the decrease of the permeability of the porous rock through contact with water. Such drilling fluids offer severe disadvantages to the employment of electric logging since the presence of large quantities of electrolytes render the electric log obtained of substantially no value.

Considerable work has been done in an attempt to develop additive agents for drilling fluids which impart desirable filtration rate, viscosity, and other physical characteristics thereto. The presence of quantities of dissolved salts in the drilling fluid, which may arise from the saline constituents of connate water or from their deliberate addition to the drilling fluid, causes partial or complete flocculation of colloidal particles suspended in the drilling fluid. This flocculation causes an immediate increase of the viscosity and of the filtration rate, which factors often render the drilling fluid completely inoperable depending upon the quantity and nature of the salts present.

It is a primary object of this invention to produce a drilling fluid comprising a dispersion of a protecting agent consisting essentially of an ammonium or alkali metal salt of a polymer of acrylic acid in a liquid, wherein the use of the protecting agent permits the use of water soluble salts in the drilling fluid to treat the formation and produces a fluid having a low water loss and a low viscosity.

Another object of this invention is to provide for the treatment of a drilling fluid which treatment will impart to the fluid a filtration rate of less than about 15 ml. and at most not more than 22 ml. during the first fifteen minutes and a viscosity which is sufficiently low to permit convenient handling of the drilling fluid in oil and gas well drilling.

It is another object of this invention to provide a treatment for drilling fluids containing water-soluble salts, such as those containing an alkali metal ion and an anion of a strong mineral acid which treatment causes the drilling fluid to have a filtration rate of less than about 22 ml. during the first fifteen minutes and an operable viscosity.

It is another object of this invention to provide a drilling fluid containing added water-soluble salts together with a protecting agent, which drilling fluid is substantially stable and free from bacterial action.

It is a still further object of this invention to provide a drilling fluid containing an alkali metal salt and in particular the sodium salt of a polymer of acrylic acid, which polymer is resistant to bacterial action.

It is still another object of this invention to improve the potential productivity of oil wells through the use of a drilling fluid containing water-soluble salts, which drilling fluid loses to productive formations a filtrate which tends to increase the effective permeability of the formation and thus increase the potential production rate.

It is a more specific object of the present invention to provide a treatment for drilling fluids which comprises the addition of a water-soluble salt to assist in the treatment of production zones through which the well is drilled and sufficient quantities of an alkali metal salt of a polymer of acrylic acid to control the viscosity and filtration rate properties of the fluid without deleteriously altering its cake forming property or its desirability as a drilling fluid.

It is an additional object of this invention to provide a method for drilling oil and gas wells which employs the drilling fluid described herein and which aids in the completion of wells having improved productivities.

It is an additional object of this invention to provide a drilling fluid which is immune to the deleterious thickening action of salt.

It is another object of this invention to produce drilling fluids containing polyacrylates and in particular the alkali metal and ammonium salts of polyacrylic acids having a molecular weight of between 5,000 and 50,000.

Other objects and advantages of this invention will become apparent to those skilled in the art as the description thereof proceeds.

Briefly, this invention relates to drilling fluids which contain a protecting agent comprising an alkali metal or ammonium salt of a polymer of acrylic acid. These drilling fluids may contain solid suspending agents of the colloidal clay type such a bentonite, montmorillonite and the like and/or of the weighting agent type such as barytes, hematite, metal powders, and metallic dust. The liquid medium of the drilling fluid may be water, a hydrocarbon oil, or emulsions of water in oil or oil in water.

In one modification the drilling fluid comprises an aqueous suspension of clay in the presence of an alkali metal or ammonium salt of a polymer of acrylic acid as a protecting agent. This drilling fluid is particularly well adapted for drilling through salt beds since the contamination of this drilling fluid with salts dissolved from the formation during drilling causes only slight changes in the physical properties of the fluid. Drilling fluids of this composition, such as are disclosed in this invention, possess suitable viscosity and water loss characteristics to permit their use in general drilling operations.

In another modification of this invention the drilling fluid comprises an aqueous suspension of clay, a protecting agent comprising an alkali metal or ammonium salt of a polymer of acrylic acid, and a water soluble salt of ammonium or an alkali metal. The water soluble salt of ammonia or an alkali metal may be any organic or inorganic salt which is without adverse effect on the formation, such as sodium carbonate, sodium chloride, sodium phosphate, sodium acetate, sodium sulfate, potassium carbonate, potassium chloride, potassium phosphate, potassium acetate, sodium sulfate, lithium chloride, lithium sulfate, ammonium sulfate, and ammonium chloride.

This latter modification of the drilling fluid of this invention is particularly suited for drilling through those formations wherein the water lost from a fresh water base drilling fluid would replace the connate water within the formation, thereby swelling the formation and decreasing its permeability to oil flow following the completion of the drilling. The brine lost from a salt-containing drilling fluid tends to deflocculate the formation and increase its permeability to fluid flow in the neighborhood of the bore hole. The use of a drilling fluid comprising an alkali metal or ammonium salt of a polymer of acrylic acid in conjunction with an ammonium or alkali metal water soluble salt constitutes a method for treating a formation during the drilling of the well in order to preserve and/or increase the permeability of the formation to fluid flow by virtue of the fact that the water normally lost in the drilling of an oil well is minimized as a result of the presence of a protecting agent in the drilling fluid and that such water as is lost from the formation does not flocculate the formation, but on the other hand tends to deflocculate the formation.

It has been found that the ammonium and alkali metal salts of the polymers of acrylic acid, herein referred to as ammonium and alkali metal polyacrylates, are very useful for the purposes of thickening a drilling fluid, dispersing and protecting a solid suspending agent of the type described herein before, decreasing the water loss from a drilling fluid to the formation, allowing the use of water soluble salts of ammonium and/or alkali metals in water based and emulsion based drilling fluids, and in conjunction with drilling fluids containing water soluble salts for treating the formation to preserve and/or increase the permeability of the formation to fluid flow. A particular advantage in the use of ammonium and alkali metal polyacrylates lies in the fact that these protecting agents are not subject to fermentation in contrast to many other additives for drilling fluids such as starch, gums, alginates and the like.

The polymer of acrylic acid for use in this invention may be any polymer having an average molecular weight in excess of about 2,000 and whose molecular weight is low enough so that its ammonium and/or alkali metal salts are dispersible in aqueous media. In general it is desirable to use those polymers whose average molecular weight is in the range of 5,000 to 50,000 and preferably in the range of 15,000 to 35,000. The salt of the polymer may be that of any alkali metal such as sodium, potassium and/or lithium. However, the sodium salts are preferred over the other alkali metal salts and the ammonium salts.

Polymers of acrylic acid which are useful in this invention are readily prepared from the monomer by the action of heat, light, and/or catalysts. Catalysts which are particularly effective for this polymerization are the organic peroxides, such as benzoyl peroxide and cumene hydroperoxide. The properties and nature of the polymer can be varied over a considerable range by the proper choice of catalysts and/or reaction conditions. The polymer can be further modified by the addition of small amounts of copolymerization agents, such as acrylonitrile, methyl acrylate, ethyl acrylate, 2-methyl propenoic acid and the like. These copolymers of acrylic acid containing up to about 10% by weight of the copolymerization agent are useful and operable in the application of this invention.

A particular polymer of acrylic acid which is suitable for use in this invention is prepared for example by polymerizing acrylic acid dissolved in water to form a 10% by weight solution of acrylic acid at a temperature of about 50 to 100° C. and using as a catalyst about 0.5% by weight of benzoyl peroxide based on the amount of acrylic acid present. The polymerization is controlled to give a polymer whose average molecular weight is about 25,000. The reaction is stopped by the neutralization of the reaction mixture with sodium hydroxide after which the sodium polyacrylate is isolated. Potassium, lithium and ammonium polyacrylates are prepared by neutralizing the reaction product with the appropriate hydroxides and these salts are also useful as protecting agents in this invention. Salts of polyacrylates of other molecular weights within the above range are prepared by varying the time, temperature or pressure of the polymerization reaction, the catalyst, or the concentration of the acrylic acid or catalyst, an increase in any of these variables in general tending to increase the average molecular weight of the polymer. Other modes of polymerization, employing no water, or organic solvents, or mixtures of organic solvents and water may also be employed. These are well known in the art.

When it is desired to use an ammonium or alkali metal polyacrylate in a drilling fluid in the absence of a water soluble salt it has been found that about 0.2 to 5.0% by weight of the alkali metal polyacrylate is effective for decreasing the water loss to the formation. However, for this use a concentration range of about 0.4 to 1.5% by weight is preferable. In general, any concentration of an ammonium or alkali metal polyacrylate in an aqueous suspension of clay or other solid suspending agent which reduces the water loss of the fluid to less than 22 ml. during the first 15 minutes and preferably less than 15 ml. during the first 15 minutes in the above test provides a useful drilling fluid and is within the scope of this invention.

In the preparation of a drilling fluid comprising an aqueous suspension of clay or other suspending agent, an ammonium or alkali metal polyacrylate and a water soluble salt of ammonia or an alkali metal, it has been found that about 0.5 to 5.0% by weight of the ammonium or alkali metal polyacrylate may be used in conjunction with about 1 to 12% by weight of an ammonium or alkali metal water soluble salt.

The preferred concentration ranges for this drilling fluid are about 1.5 to 2.5% by weight of the ammonium or alkali metal polyacrylate and about 3 to 7% by weight of the water soluble salt ammonium or an alkali metal. However, any combination of an ammonium or alkali metal polyacrylate in conjunction with about 1 to 12% by weight of an ammonium or alkali metal water soluble salt which provides a drilling fluid having a water loss of not more than 22 ml. during the first 15 minutes and preferably less than 15 ml. during the first 15 minutes is within the purview of this invention.

Perhaps the application of this invention can best be understood by reference to the following examples:

Example I

About 250 grams of drilling clay obtained from the Santa Maria Valley region of California is slurried with about 815 grams of water until the clay is entirely wetted. About 15 grams of the sodium salt of an acrylic acid polymer, having an average molecular weight of around 25,000, is dispersed in about 85 grams of water. The resultant colloidal solution is added to the clay and thoroughly dispersed therein. About 60 grams of sodium chloride is then added and the mixture stirred until the salt is completely dissolved. The resulting fluid is estimated to contain about 20% of clay, 4.9% of sodium chloride, and 1.2% by weight of sodium polyacrylate, and has approximately the following characteristics:

Viscosity, 500/500, sec_____ 29
Water loss, ml./15 min_____ 4
Weight, pounds/cu. ft_____ 74

Example II

A second drilling fluid is prepared in the same manner as in Example I, except that 250 grams of clay are slurried with 770 grams of water, 25 grams of sodium polyacrylate in which the acid polymer had an average molecular weight of about 25,000, in 130 grams of water are added thereto, and the mixture is slurried with 60 grams of sodium chloride until the latter dissolves. The fluid produced contains about 20% of clay, 4.9% of sodium chloride, and about 2.0% by weight of sodium polyacrylate, and tests as follows:

Viscosity, 500/500, sec_____ 35
Water loss, ml./15 min_____ 3
Weight, pounds/cu. ft_____ 74

Example III

A drilling fluid is also prepared as follows: 250 grams of drilling clay obtained from the Santa Maria Valley region of California is slurried with 855 grams of water for about 30 minutes. About 53 grams of a solution containing 15% by weight of the sodium polyacrylate, wherein the polymeric acid had an average molecular weight of about 25,000, is added thereto and thoroughly mixed with the mud-water slurry. The fluid thus prepared contains an estimated 22% of clay and 0.7% by weight of sodium polyacrylate, and tests substantially the same as the fluid of Example II except for a slightly higher weight.

Example IV

A drilling fluid containing about 20 grams of the ammonium salt of a polyacrylic acid having an average molecular weight of about 6,000, and about 30 grams of potassium sulfate, 50 grams of bentonite, and 200 grams of a drilling mud clay obtained from the Antelope Valley region of California, is prepared analogous to the procedure described in Example I. The fluid is estimated to contain 5% of bentonite, 20% of drilling clay, 3% of potassium sulfate and 2.0% by weight of the ammonium polyacrylate. The viscosity and water loss of this drilling fluid are slightly higher than that obtained in Example I, but are within the desirable limits described herein before and the drilling fluid is suitable for general drilling operations.

Example V

Another drilling fluid is prepared as follows: 10 grams of the potassium salt of a polymer of acrylic acid having an average molecular weight of about 35,000 is mixed with a solution of 70 grams of sodium carbonate in about 870 grams of water. To this mixture is added about 50 grams of a bentonitic clay and the mixture is stirred until the clay is thoroughly wetted. At this point the fluid contained an estimated 5% of bentonitic clay, 7% of sodium carbonate, and 1% by weight of potassium acrylate. Following these operations the drilling fluid is weighted with barytes until a weight of about 80 pounds per cubic foot is obtained. This drilling fluid possessed suitable viscosity and water loss characteristics to permit its use in general drilling operations.

Example VI

The preparation of the drilling fluid described in Example I is repeated using the sodium salt of a copolymer of acrylic acid and acrylonitrile, which copolymer contains an estimated 5% by weight of the acrylonitrile and has an average molecular weight of about 25,000, is substituted for the sodium polyacrylate of Example I. The water loss and viscosity of this mud are within the above defined suitable limits to allow its use in general drilling operations.

The above examples serve to show that desirable drilling fluids can be prepared by the use of the above polyacrylates as a protecting agent. None of the above drilling fluids fermented on long standing in contact with atmospheric air. Other water soluble salts such as those mentioned previously can be employed in the preparation of drilling fluids corresponding to these and that these drilling fluids are equally as desirable and useful as those which have just been described in detail.

Water soluble salts of amines such as mono, di, and trimethylamine hydrochloride, isopropylamine hydrochloride and triethanolamine sulfate may also be employed in the application of this invention. Other polyacrylate salts such as lithium and other alkali metal salts may be similarly employed. The above amine salts of polyacrylic acids are also useful in the application of this invention.

One or more water soluble salts of ammonia or an alkali metal may be used in conjunction with one or more ammonium or alkali metal salts of a polyacrylic acid wherein the polyacrylic acid has a molecular weight in excess of 2,000 and desirably in the range of 5,000 to 50,000. Thus, potassium chloride may be used in conjunction with potassium sulfate and sodium polyacrylate may be used in conjunction with potassium polyacrylate.

Although the foregoing examples have employed substantially the same order of mixing throughout, the order of mixing may also be changed provided adequate stirring and/or mixing is used to homogenize the material prior to use.

When an oil well is drilled using a drilling fluid corresponding to those described in the above examples, the same drilling techniques are used as with conventional drilling muds, but it is found by comparison of the production of the well with the production from wells which were drilled with conventional fresh water based fluids not containing the protective agent described herein, that the well drilled according to the principles of this invention has an increased production as a result of the treatment of the formation with the salt-containing filtrate of the drilling fluid.

Each of the foregoing examples describes a water base drilling fluid. However, alkali metal and ammonium polyacrylates may also be used in conjunction with other types of drilling fluids such as emulsion based fluids in order to impart certain desirable characteristics to these fluids. Emulsion based drilling fluids are prepared by heating an emulsifier such as triethanol amine oleate with a cracked residuum to form a mixture containing about 0.1 to 1% by weight of the emulsifier. The solution of the emulsifier in oil may then be blended with any water base drilling fluid containing an ammonium or alkali metal polyacrylate, such as any of those described above, and in any desired volume ratio such as in equal parts by volume.

Polyacrylate salts of both monovalent and/or divalent metals such as iron, aluminum, zinc, calcium, barium, sodium and potassium may also be dispersed in an oil to furnish oil based drilling muds. These drilling fluids may be prepared with or without the use of solid suspending agents, various metallic soaps of carboxylic and sulfonic acid and/or the conventional additives to oil base drilling fluids. The oil base for the drilling fluid may be a topped straight run fraction from any crude, a thermally cracked residuum obtained from any crude, Diesel fuel and/or other hydrocarbon fractions preferably boiling above 700° F.

In general, the salts of polymers of other alpha-beta unsaturated acid having from three to about six carbon atoms, such as alpha methylacrylic acid, crotonic acid, alpha ethyl acrylic acid, may be used in place of the polymers of acrylic acid throughout this invention. It is desirable to use polymers of about the same molecular weight ranges as have been described herein before for the polymers of acrylic acid.

Having fully described and disclosed the principles of our invention we wish to claim the following:

1. A drilling fluid which comprises an aqueous suspension of clay 0.5 to 5.0% by weight of an alkali metal salt of a polymer of acrylic acid having an average molecular weight of between 5,000 and 50,000 and 3 to 7% by weight of a chloride selected from the class consisting of ammonium and alkali metal chlorides.

2. A drilling fluid for the drilling of oil and gas wells which comprises an inorganic solid suspending agent, a liquid dispersing medium selected from the class consisting of water, hydrocarbon oils and emulsions of water and hydrocarbon oils, and between about 0.5 to 5.0% by weight of a salt of a polymer of an alpha-beta unsaturated acid, said salt of said polymer being soluble in said liquid dispersing medium, the monomer of said alpha-beta unsaturated acid containing from 3 to 6 carbon atoms and wherein said salt comprises cations selected from the class consisting of monovalent and divalent metallic ions and ammonium ion and wherein said polymer has a molecular weight of at least 2,000.

3. A drilling fluid according to claim 2 wherein said polymer has a molecular weight between about 5,000 and 50,000 and said liquid dispersing medium is an emulsion of water and hydrocarbon oil.

4. A drilling fluid according to claim 2 wherein said polymer has a molecular weight between about 5,000 and 50,000 and said liquid dispersing medium is water.

5. A drilling fluid according to claim 2 wherein said polymer has a molecular weight between about 5,000 and 50,000 and said liquid dispersing medium is a hydrocarbon oil.

6. A drilling fluid for the drilling of oil and gas wells which comprises an inorganic solid suspending agent, an aqueous dispersing medium, and between about 0.5 and 5.0% by weight of an alkali metal salt of a polyacrylic acid, said polyacrylic acid having a molecular weight of at least 2,000.

7. A drilling fluid according to claim 6 wherein the polyacrylic acid has a molecular weight between about 5,000 and 50,000.

8. A drilling fluid according to claim 6 wherein the polyacrylic acid has a molecular weight between about 5,000 and 50,000 and the salt of the polyacrylic acid is a sodium salt.

9. A drilling fluid for the drilling of oil and gas wells which comprises an inorganic solid suspending agent, an aqueous dispersing medium, and between about 0.5 and 5.0% by weight of an alkali metal salt of a polymer of acrylic acid, said polymer comprising between about 0.1 and 10% by weight of a polymerized copolymerization agent selected from the class consisting of low molecular weight esters and nitriles of 3 and 4 carbon alpha-beta unsaturated acids, said polymer having a molecular weight of at least 2,000.

10. A drilling fluid for the drilling of oil and gas wells which comprises between about 1 and 12% by weight of a water-soluble salt selected from the class consisting of alkali metal and ammonium water-soluble salts, an inorganic solid suspending agent, an aqueous dispersing medium, and between about 0.5 and 5.0% by weight of an alkali metal salt of a polymer of an alpha-beta unsaturated acid containing from 3 to 6 carbon atoms, said polymer having a molecular weight of at least 2,000.

11. A drilling fluid according to claim 10 which comprises between about 3 and 7% by weight of said water-soluble salt and wherein said molecular weight of said polymer is between about 5,000 and 50,000.

12. A drilling fluid for the drilling of oil and gas wells which comprises between about 1 and 12% by weight of a water-soluble salt selected from the class consisting of alkali metal and ammonium water-soluble salts, an inorganic solid suspending agent, an aqueous dispersing medium and between about 0.5 and 5.0% by weight of an alkali metal salt of a polymer of acrylic acid, said polymer having a molecular weight of a least 2,000.

13. A drilling fluid acoding to claim 12 which comprises between about 3 and 7% by weight of said water-soluble salt.

14. A drilling fluid according to claim 12 wherein said polymer has a molecular weight between about 5,000 and 50,000.

15. A drilling fluid according to claim 12 wherein said polymer comprises between about 0.1 to 10% by weight of a polymerized copolymerization agent selected from the class consisting of esters and nitriles having between 3 and 4 carbon atoms.

16. A drilling fluid for the drilling of oil and gas wells which comprises an inorganic solid suspending agent, an aqueous dispersing medium, and between about 0.5 and 5.0% by weight of an ammonium salt of a polyacrylic acid, said polyacrylic acid having a molecular weight of at least 2,000.

17. A drilling fluid according to claim 16 wherein the polyacrylic acid has a molecular weight between about 5,000 and 50,000.

18. A drilling fluid for the drilling of oil and gas wells which comprises an inorganic solid suspending agent, an aqueous dispersing medium, and between about 0.5 and 5.0% by weight of an ammonium salt of a polymer of acrylic acid, said polymer comprising between about 0.1 and 10% by weight of a polymerized copolymerization agent selected from the class consisting of low molecular weight esters and nitriles of 3 and 4 carbon alpha-beta unsaturated acids, said polymer having a molecular weight of at least 2,000.

19. A drilling fluid for the drilling of oil and gas wells which comprises between about 1 and 12% by weight of a water-soluble salt selected from the class consisting of alkali metal and ammonium water-soluble salts, an inorganic solid suspending agent, an aqueous dispersing medium, and between about 0.5 and 5.0% by weight of an ammonium salt of a polymer of an alpha-beta unsaturated acid containing from 3 to 6 carbon atoms and wherein said polymer has a molecular weight of at least 2,000.

20. A drilling fluid according to claim 19 which comprises between about 3 and 7% by weight of said water-soluble salt and wherein said molecular weight of said polymer is between about 5,000 and 50,000.

21. A drilling fluid for the drilling of oil and gas wells which comprises between about 1 and 12% by weight of a water-soluble salt selected from the class consisting of alkali metal and ammonium water-soluble salts, an inorganic solid suspending agent, an aqueous dispersing medium and between about 0.5 and 5.0% by weight of an ammonium salt of a polymer of acrylic acid, said polymer having a molecular weight of at least 2,000.

22. A drilling fluid according to claim 21 which comprises between about 3 and 7% by weight of said water-soluble salt.

23. A drilling fluid according to claim 21 wherein said polymer has a molecular weight between about 5,000 and 50,000.

24. A drilling fluid according to claim 21 wherein said polymer comprises between about 0.1 to 10% by weight of a polymerized copolymerization agent selected from the class consisting of esters and nitriles having between 3 and 4 carbon atoms.

PAUL W. FISCHER.
JAMES F. COOK.

REFERENCES CITED

The following references are of record in the file of this patent:

UNITED STATES PATENTS

| Number | Name | Date |
| --- | --- | --- |
| 1,976,679 | Fikentscher et al. | Oct. 9, 1934 |
| 2,204,520 | Walker | June 11, 1940 |
| 2,209,591 | Barnes | July 30, 1940 |
| 2,244,703 | Hubluch | June 10, 1941 |
| 2,317,328 | Kinney | Apr. 20, 1943 |
| 2,318,429 | Smith | May 4, 1943 |
| 2,425,768 | Wagner | Aug. 19, 1947 |